(12) United States Patent
Fujiwara et al.

(10) Patent No.: US 8,468,893 B2
(45) Date of Patent: Jun. 25, 2013

(54) PRESSURE METER

(75) Inventors: Tohru Fujiwara, Katsushika-ku (JP);
Ken Iwawaki, Katsushika-ku (JP)

(73) Assignee: Krone Corporation, Katsushita-Ku (JP)

( * ) Notice: Subject to any disclaimer, the term of this patent is extended or adjusted under 35 U.S.C. 154(b) by 0 days.

(21) Appl. No.: 12/737,845

(22) PCT Filed: May 13, 2010

(86) PCT No.: PCT/JP2010/058093
§ 371 (c)(1),
(2), (4) Date: Feb. 17, 2011

(87) PCT Pub. No.: WO2010/131702
PCT Pub. Date: Nov. 18, 2010

(65) Prior Publication Data
US 2012/0247214 A1    Oct. 4, 2012

(30) Foreign Application Priority Data

May 13, 2009 (JP) ................................. 2009-117056

(51) Int. Cl.
*G01L 7/00* (2006.01)
(52) U.S. Cl.
USPC ........................................................ 73/700
(58) Field of Classification Search
None
See application file for complete search history.

(56) References Cited

U.S. PATENT DOCUMENTS

| | | | |
|---|---|---|---|
| 3,977,434 A * | 8/1976 | Albright et al. | 137/625.47 |
| 5,335,543 A * | 8/1994 | Hermansen | 73/431 |
| 5,895,861 A * | 4/1999 | Slonaker | 73/732 |
| 6,283,146 B1 * | 9/2001 | Okitsu | 137/505.26 |
| 7,047,812 B2 * | 5/2006 | Itou | 73/714 |
| 2002/0134165 A1* | 9/2002 | Chou | 73/733 |
| 2002/0194924 A1* | 12/2002 | Ozawa | 73/729.2 |
| 2009/0301213 A1* | 12/2009 | Barmettler et al. | 73/753 |

FOREIGN PATENT DOCUMENTS

| | | |
|---|---|---|
| JP | 9-304212 | 11/1997 |
| JP | 2004-177355 | 6/2004 |
| JP | 2008-111788 | 5/2008 |
| JP | 2008-249499 | 10/2008 |
| JP | 2008-268211 | 11/2008 |

* cited by examiner

*Primary Examiner* — Andre Allen
(74) *Attorney, Agent, or Firm* — Masuvalley & Partners

(57) ABSTRACT

There is provided a pressure gauge which enables swinging and rotation with respect to a pressure gauge body capable of visually confirming the pressure indication of pressure to be measured. A tubular pressure introduction section 6 through which the pressure to be measured is introduced into the inside is inserted in a pressure introduction port 21 and adapted to be rotatable with respect to a pressure gauge body 2 capable of visually confirming the pressure indication of the pressure to be measured, enabling swinging. A rotating cap 11 rotatable in a circumferential direction is also adapted to be rotatable with respect to this pressure gauge body 2, which can rotate together with a liquid crystal indicator 100 on a substrate 10 attached to the rotating cap 11.

2 Claims, 5 Drawing Sheets

FRONT SIDE

BACK SIDE

PRIOR ART

PRESSURE METER

This is a U.S. national stage application of International Application No. PCT/JP2010/058093, filed on May 13, 2010. Priority under 35 U.S.C. §119(a) and 35 U.S.C. §365(b) is claimed from Japanese Patent Application No. 2009-117056 filed on May 13, 2009, the disclosure of which is also incorporated herein by reference.

TECHNICAL FIELD

The present invention relates to a pressure gauge, and particularly to a pressure gauge equipped with a swing mechanism and a rotating mechanism with respect to a pressure gauge body.

BACKGROUND ART

Conventionally, there have been pressure gauges screwed into a mounting pipe and fixed to measure and indicate pressure to be measured and introduced from the mounting pipe. In visually confirming the indication of measured pressure using this type of pressure gauge, the direction of the pressure gauge may need changing to make visual confirmation easy, depending on the installation position of the mounting pipe and the pressure gauge. However, since the pressure gauge is screwed tightly into the mounting pipe and fixed, it is not easy to change the direction.

To cope with this, a pressure gauge described in Japanese Patent Application Publication No. 2004-177355 (Paragraph [0008] and FIG. 1) has an indication section for providing a pressure indication on two opposite faces (front and back faces) of the pressure gauge body so that the pressure indication can be visually confirmed on both the front and back faces of the pressure gauge body (see FIG. 5).

DISCLOSURE OF THE INVENTION

Problem to be Solved by the Invention

The pressure gauge that enables the visual confirmation of the pressure indication on both the front and back faces expand the range of visual confirmation compared with pressure gauges that provide a pressure indication on the front surface alone. However, since the installation position of the mounting pipe and the pressure gauge is not alternative every 180 degrees, the conventional pressure gauge may make visual confirmation difficult depending on the measurement environment and hence require a further change in direction.

The present invention has been made in view of such a point, and it is an object thereof to provide a pressure gauge which enables swinging and rotation with respect to a pressure gauge body capable of visually confirming the pressure indication of pressure to be measured.

SUMMARY OF THE INVENTION

In order to solve the above problem, a pressure gauge of the present invention is such that a tubular pressure introduction section, through which pressure to be measured is introduced into the inside, is adapted to be rotatable with respect to a pressure gauge body capable of visually confirming the pressure indication of the pressure to be measured, enabling swinging. A rotating cap rotatable in a circumferential direction is also adapted to be rotatable with respect to this pressure gauge body, enabling rotation.

To be more specific, the present invention provides the following.

(1) A pressure gauge comprising: a pressure gauge body capable of visually confirming the pressure indication of pressure to be measured; a tubular pressure introduction port provided to project from the pressure gauge body; and a tubular pressure introduction section inserted in the pressure introduction port to introduce the pressure to be measured into the inside, wherein the pressure introduction section is rotatable with respect to the pressure gauge body.

According to this aspect of the present invention, the pressure gauge has a double structure of the pressure introduction port provided in the pressure gauge body and the pressure introduction section inserted in the pressure introduction port, so that the relative position of the pressure introduction section and the pressure gauge body (the pressure introduction port provided in the pressure gauge body) can vary. This enables the pressure gauge body to swing when considering the pressure introduction port as a neck, and hence makes it easy to confirm the pressure indication from an angle suitable for visual confirmation.

(2) A pressure gauge comprising: a pressure gauge body capable of visually confirming the pressure indication of pressure to be measured; a rotating cap rotatable in a circumferential direction; and a locking body provided such that one face is engaged with the pressure gauge body to stop each other and the other face is engaged with the rotating cap, wherein the rotating cap is rotatable with respect to the pressure gauge body.

According to this aspect of the present invention, the locking body with one face engaged with the pressure gauge body to stop each other and the other face engaged with the rotating cap can vary the relative position of the rotating cap and the pressure gauge body (the locking body engaged with the pressure gauge body to stop each other). This enables rotation with respect to the pressure gauge body in the circumferential direction, and hence makes it easy to confirm the pressure indication from an angle suitable for visual confirmation.

(3) A pressure gauge in which a restricting member for restricting the rotation with respect to the pressure gauge body is formed in the pressure introduction section or the rotating cap.

According to this aspect of the present invention, the restricting member is formed in the pressure introduction section or the rotating cap to restrict the rotation angle within a range from zero to less than 360 degrees so that negative effects caused by making the rotation with respect to the pressure gauge body unrestricted can be prevented.

BEST MODE FOR CARRYING OUT THE INVENTION

Figure 1:
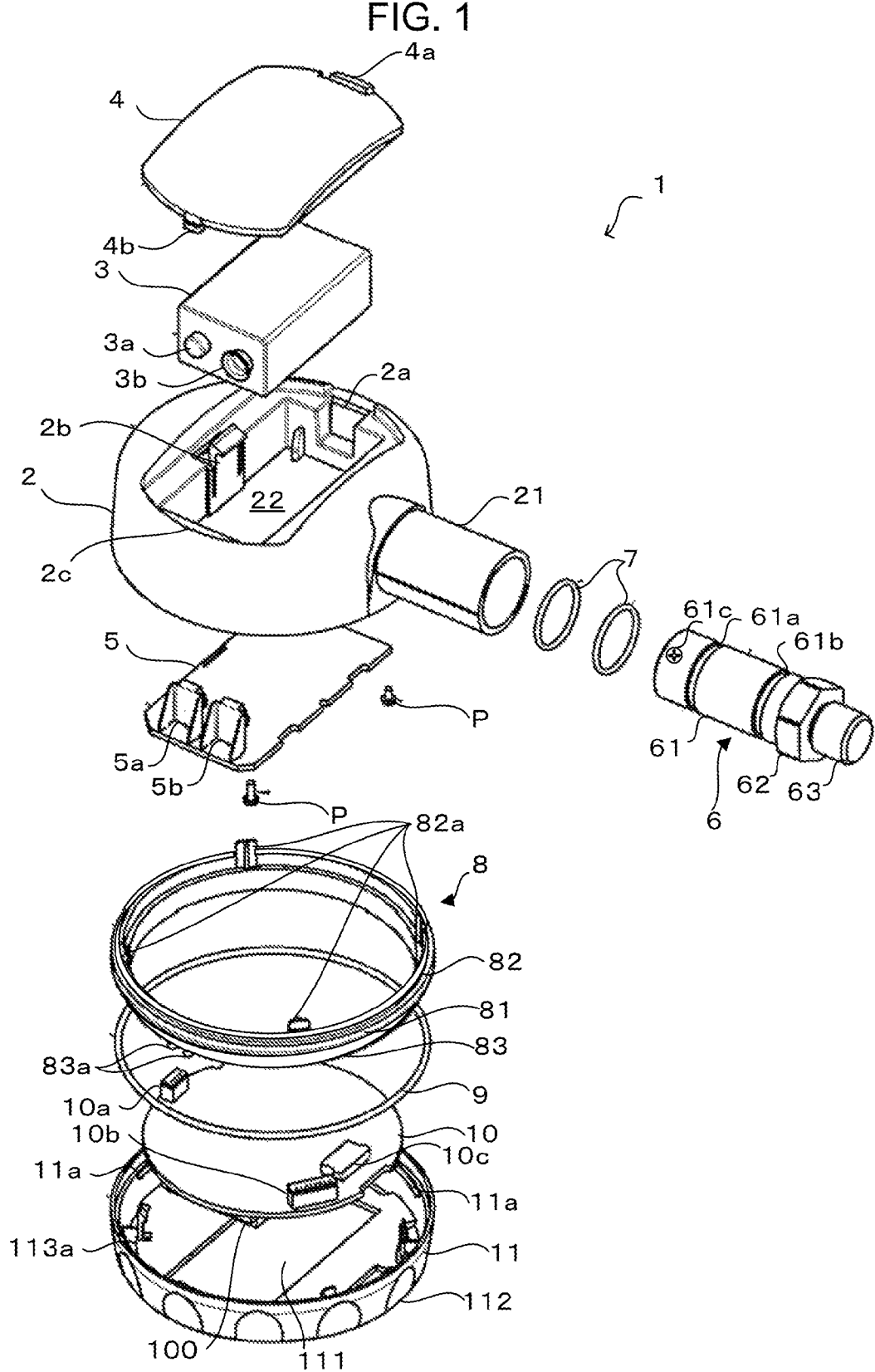
FIG. 1 is an exploded perspective view of a pressure gauge according to a preferred embodiment of the present invention.

A preferred embodiment of the present invention will now be described with reference to the accompanying drawings. FIG. 1 is an exploded perspective view of a pressure gauge 1 according to the embodiment of the present invention. FIGS.

Figure 2A:
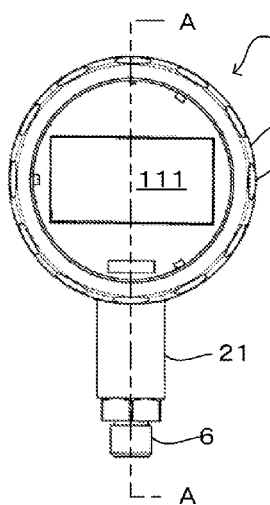
FIGS. 2A, 2B and 2C are schematic diagrams of the pressure gauge according to the embodiment of the present invention.
Figure 2B:
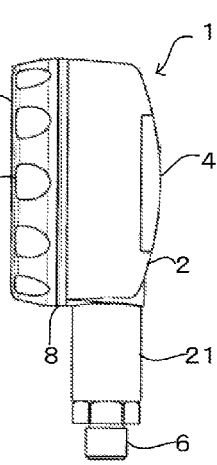
Figure 2C:
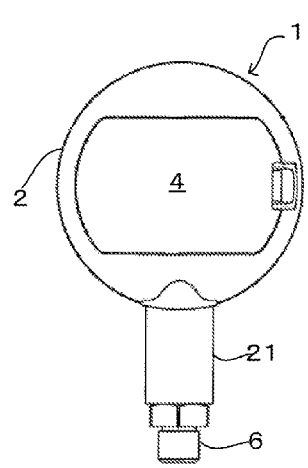
Figure 3:
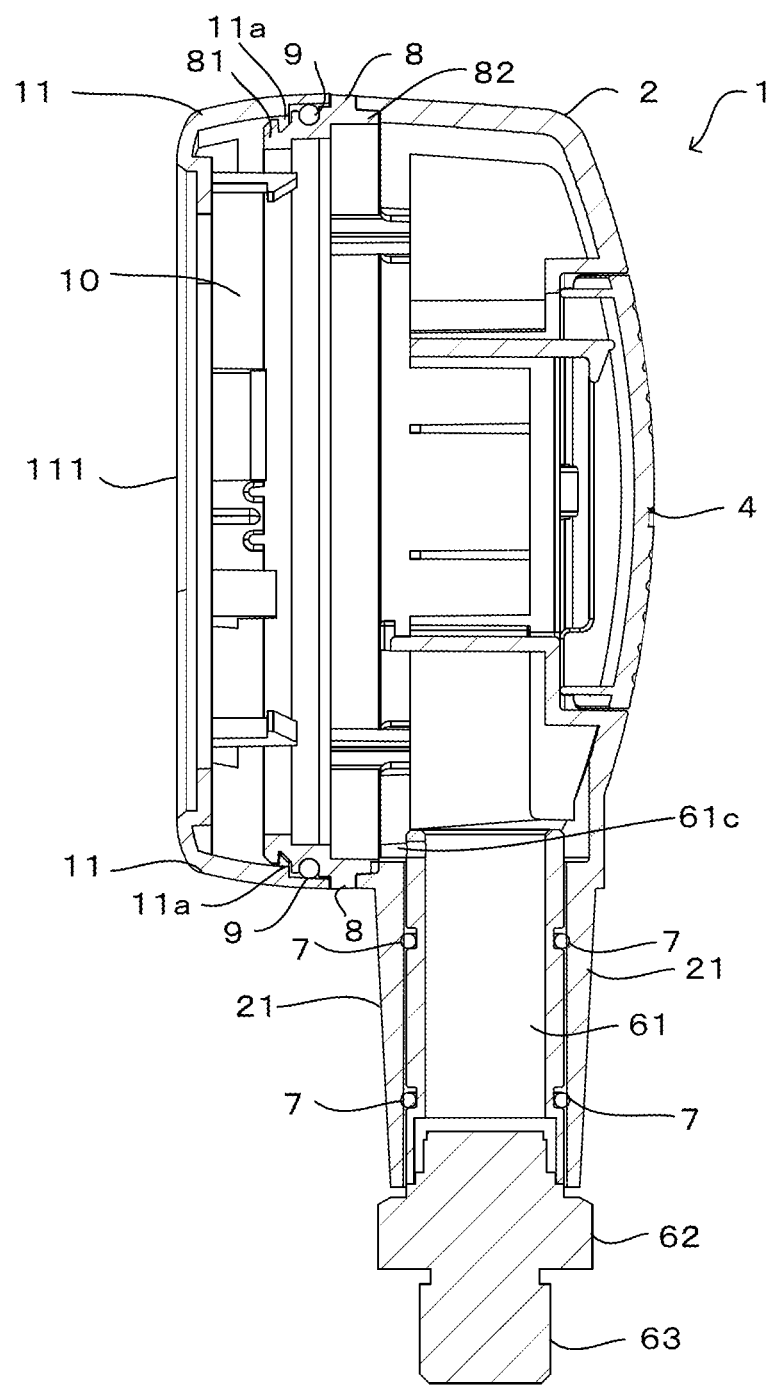
FIG. 3 is a sectional view taken along line A-A in FIG. 2A.

2A, 2B and 2C are schematic diagrams of the pressure gauge 1 according to the embodiment of the present invention, where FIG. 2A is a front view, FIG. 2B is a left (right) side view, and FIG. 2C is a back view. FIG. 3 is a sectional view taken along line A-A in FIG. 2A.

The pressure gauge 1 is such that a generally circular pressure gauge body 2 is formed with a hollow and a tubular pressure introduction port 21 projecting from and formed integrally with the pressure gauge body 2 is provided. A housing chamber 22 for accommodating a battery 3 is formed in the hollow region of the pressure gauge body 2. The battery 3 is accommodated in the housing chamber 22 with a cover 4 and a base 5 fastened on the pressure gauge body 2 with screws P. Electrodes 3a and 3b of the battery 3 come into contact with connection terminals 5a and 5b of the base 5, respectively, to establish an electrical connection. Further, the battery 3 is retained by an L-shaped claw 2b, and claws 4a and 4b of the cover 4 are engaged with claws 2a and 2c in the housing chamber 22 to attach the cover 4 to the pressure gauge body 2.

A tubular pressure introduction section 6 is inserted into the tubular pressure introduction port 21 so that pressure to be measured will be introduced from the pressure introduction section 6 into the pressure gauge body 2. The pressure introduction section 6 is formed of an insertion portion 61 inserted into the pressure introduction port 21, a hexagonal portion 62 as an example of a polygonal shape, and an introduction portion 63 for introducing the pressure to be measured, with recessed grooves 61a and 61b formed in the circumferential direction of the insertion portion 61. O rings 7 are inserted on recessed grooves 61a and 61b, respectively, so that the O rings 7 will slide over the inner face of the pressure introduction port 21. This makes the pressure introduction section 6 rotatable with respect to the pressure gauge body 2 integrally formed with the pressure introduction port 21.

The insertion portion 61 is formed longer in the axial direction than the pressure introduction port 21 to project slightly into the hollow region of the pressure gauge body 2. A restricting member 61c is formed in this projecting position of the insertion portion 61 and a ridge is provided in the pressure gauge body 2 to contact the restricting member 61c. Therefore, when the pressure introduction section 6 is rotated, the restricting member 61c is locked by the ridge in an engaged manner, and this can restrict the rotation with respect to the pressure gauge body 2 within a range of rotation angles from zero to less than 360 degrees.

Figure 4A:
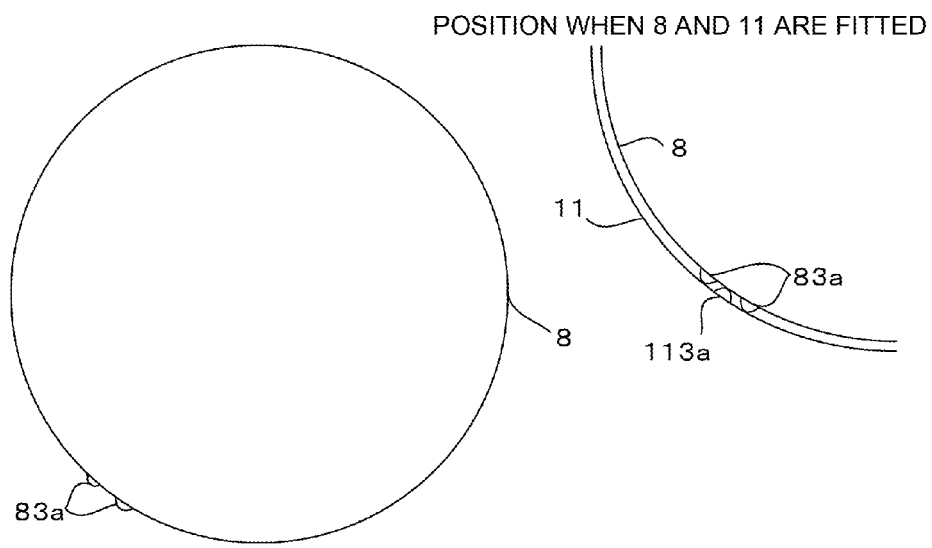
FIGS. 4A and 4B are diagrams showing a state of restricting the rotation of the rotating cap.
Figure 4B:
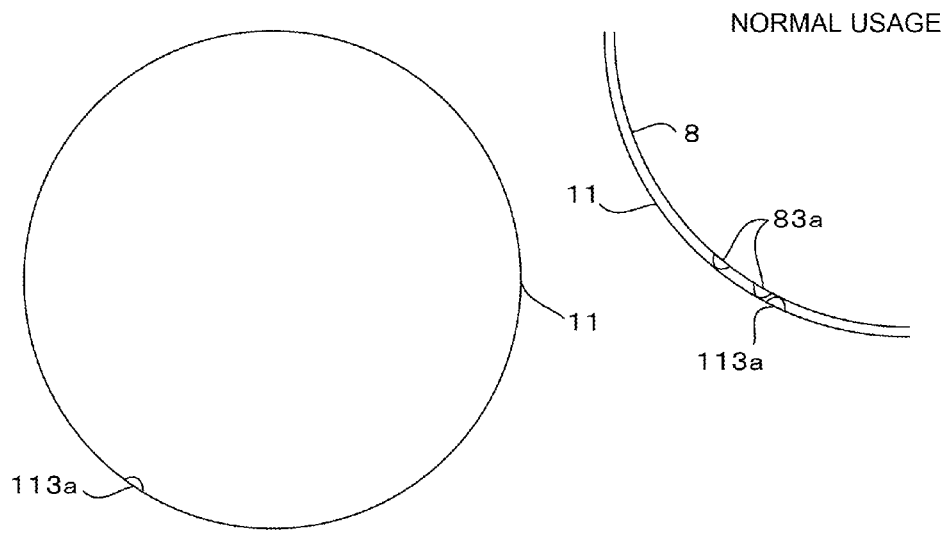
Figure 5:
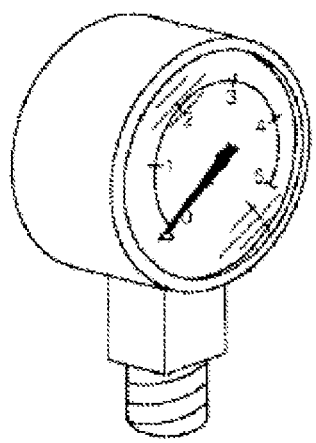
FIG. 5 is a schematic diagram of a conventional pressure gauge.
Figure 5:
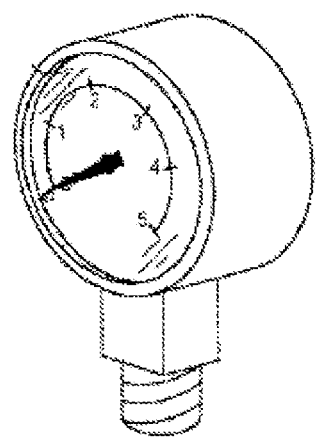

The locking body 8 has a generally raised shape along the circumferential direction, including a groove 82 formed when the locking body 8 is engaged with the pressure gauge body 2 to stop each other, a groove 83 formed when the locking body 8 is engaged with the rotating cap 11, and a protruding portion 81 protruding from the grooves 82 and 83. Claws 82a to be engaged with the pressure gauge body 2 to stop each other are provided in the region of the groove 82. Further, claws 83a to be engaged with a claw 113a of the rotating cap 11 are provided in the region of the groove 83 so that the claws 83a and the claw 11a will restrict the rotation angle of the rotating cap 11. In other words, as shown in FIGS. 4A and 4B, the claws (projections) 83a are provided in the locking body 8 and the claw (projection) 113a is provided in the rotating cap 11, and when the locking body 8 and the rotating cap 11 are fitted, the claw 113a is fitted in between the claws 83a, 83a. In this state, the rotating cap 11 is rotated to let the claw 113a out from between the claws 83a, 83a, and this enables the rotating cap 11 to rotate within the overall range except both ends of the claws 83a.

The rotating cap 11 has an indication window 111, and plural dimples 112 are formed on the circumferential surface to help rest one's fingers thereon to make it easy to rotate. A substrate 10 on which a control circuit (IC chip) for pressure measurement/indication and a liquid crystal indicator 100 indicating the result are mounted is attached to the rotating cap 111. The substrate 10 is so attached that the liquid crystal indicator 100 can be viewed through the indication window 111. An inlet 10a from which the pressure to be measured is taken in is provided on the substrate 10, and a cable or the like used to take, into the inlet 10a, the pressure to be measured and introduced from the pressure introduction section 5 is connected to the substrate 10. A connector terminal 10b is also provided on the substrate 10 and connected to a connector for an electrical connection with the connection terminals 5a, 5b of the base 5 or the like. A connector 10c for a surface membrane is provided on the substrate 10 as well.

The rotating cap 11 to which the substrate 10 thus connected with the various connectors and the cable or the like is attached is engaged with the locking body 8 through an O ring 9. Since there is a possibility that the rotation of the rotating cap 11 causes the various connectors and the cable or the like to get entangled or too much rotation makes the length of the cable or the like so short that it will come out of the connection terminal, the restricting member is formed in the rotating cap 11 to restrict the rotation, and this can restrict the rotating cap 11 within the range of rotation angles from zero to less than 360 degrees.

INDUSTRIAL APPLICABILITY

The pressure gauge according to the present invention enables swinging and rotation with respect to the pressure gauge body capable of visually confirming the pressure indication of pressure to be measured, and this is useful to make it easy to confirm the pressure indication from an angle suitable for visual confirmation.

EFFECT OF THE INVENTION

As described above, the present invention enables swinging and rotation with respect to the pressure gauge body capable of visually confirming the pressure indication of the pressure to be measured, and this makes it easy to confirm the pressure indication from an angle suitable for visual confirmation.

The invention claimed is:

1. A pressure gauge comprising:
   a pressure gauge body capable of visually confirming a pressure indication of pressure to be measured;
   a tubular pressure introduction port projected from the pressure gauge;
   a tubular pressure introduction section having recessed grooves formed in a circumferential direction of the tubular pressure introduction section to introduce the pressure to be measured into inside the pressure gauge,
   sliding members, which are arranged to fit into the grooves in a state where the pressure introduction section is inserted in the tubular pressure introduction port,
   wherein the sliding members slide over an inner surface of the pressure introduction port to make the pressure introduction section rotatable with respect to the pressure gauge body,
   a restricting member provided on the pressure introduction section, and
   a ridge provided in the pressure gauge body, which locks the restricting member in an engaged manner to restrict rotation of the tubular pressure introduction section with respect to the pressure gauge body.

2. A pressure gauge comprising:

a pressure gauge body capable of visually confirming a pressure indication of pressure to be measured;

a tubular pressure introduction section being inserted into the pressure gauge body to introduce pressure to be measured into inside the pressure gauge, the tubular pressure introduction section being rotatable with respect to the pressure gauge body;

a rotating cap rotatable in a circumferential direction thereof, the rotating cap including a substrate onto which an indicator is mounted;

a locking body, one face of the locking body being engaged with the pressure gauge body to stop each other and the other face of the locking body being engaged with the rotating cap, a restricting member provided on the rotating cap, and projections provided on a surface of the rocking body to which the rotating cap faces, wherein a rotation axis of the pressure introduction section and a rotation axis of the rotating cap are substantially orthogonal to each other, and the rotating cap is rotatable with respect to the pressure gauge body, and wherein rotation of the rotating cap with respect to the pressure gauge body is regulated by engaging the restricting member with the projections.

\* \* \* \* \*